United States Patent
Liu

(10) Patent No.: US 9,152,197 B2
(45) Date of Patent: Oct. 6, 2015

(54) OVERCURRENT PROTECTION CIRCUIT AND SERVER USING THE SAME

(71) Applicant: WISTRON CORP., New Taipei (TW)

(72) Inventor: Shih-Chieh Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 14/183,684

(22) Filed: Feb. 19, 2014

(65) Prior Publication Data

US 2015/0026486 A1    Jan. 22, 2015

(30) Foreign Application Priority Data

Jul. 22, 2013   (TW) .............................. 102126088 A

(51) Int. Cl.
*H02H 3/08* (2006.01)
*G06F 1/26* (2006.01)
*H02H 3/087* (2006.01)

(52) U.S. Cl.
CPC . *G06F 1/26* (2013.01); *H02H 3/087* (2013.01)

(58) Field of Classification Search
USPC ........................................................ 361/93.7
See application file for complete search history.

(56) References Cited

U.S. PATENT DOCUMENTS

| | | | | |
|---|---|---|---|---|
| 6,125,020 | A | * | 9/2000 | Oh ................................... 361/22 |
| 6,141,197 | A | * | 10/2000 | Kim et al. ..................... 361/93.5 |
| 2010/0188784 | A1 | * | 7/2010 | Young .............................. 361/18 |

FOREIGN PATENT DOCUMENTS

CN      101144836 A      3/2008
CN      202133708 U      2/2012

OTHER PUBLICATIONS

Taiwan Patent Office, Office action issued on Mar. 10, 2015.

* cited by examiner

*Primary Examiner* — Dharti Patel
(74) *Attorney, Agent, or Firm* — Li & Cai Intellectual Property (USA) Office

(57) ABSTRACT

An overcurrent protection circuit and a server using the same are provided. The overcurrent protection circuit coupled between a power supply module and a load on a mainboard including a detecting component, a detection unit, a comparing unit, and a power switch. The detecting component is coupled between the power supply module and the detection unit. The detection unit detects a detecting voltage generated by the detecting component responsive to a supplying current. The comparing unit generates a control voltage according to the detecting voltage and a reference voltage. The power switch is coupled between the detecting component and the load and is controlled by the control voltage. When the comparing unit determines that the detecting voltage is greater than the reference voltage, the comparing unit cuts off the power switch to disconnect a power supply path between the power supply module and the load.

20 Claims, 6 Drawing Sheets

OVERCURRENT PROTECTION CIRCUIT AND SERVER USING THE SAME

BACKGROUND

1. Technical Field

The present disclosure relates to a protection circuit, in particular, to an overcurrent protection circuit and a server using the same.

2. Description of Related Art

As technology advances, computer systems such as servers and disk storage systems with high computational resource, relative large storage space, and ability to simultaneously communicate with multiple computer devices through the Internet, have become essential equipment in modern network communication architecture.

In order to satisfy the computer system maintenance and upgrade requirements, a computer system in general has to support hot plugging operations under normal system operation. However, frequent hot plugging operations may generate large input current cause system components to be malfunctioned or even permanently damage system components (e.g., hard disk or central processing unit) or peripheral devices of the computer system. Accordingly, the server and the disk storage system or the peripheral devices may be malfunctioned or even result in data loss due to breakdown of system components, thereby decrease the performance of the server or the disk storage system.

SUMMARY

Accordingly, the present disclosure provides an overcurrent protection circuit and a server using the same. The overcurrent protection circuit can actively detect whether an input current supplied (e.g., inrush current generated when the server connects to a power source) to a mainboard of the server from an input power is too large, and stop providing the input power to a system load when detects that the input current is too large so as to prevent the system load from being damaged by over current.

An exemplary embodiment of the present disclosure provides an overcurrent protection circuit. The overcurrent protection circuit is disposed on a mainboard and is coupled between a power supply module and a load on the mainboard. The overcurrent protection circuit comprises a detecting component, a detection unit, a comparing unit, and a power switch. The detecting component has a first end and a second end. The first end is coupled to the power supply module. The detection unit is respectively coupled to the first end and the second end for detecting a detecting voltage generated by the detecting component responsive to a supplying current outputted from the power supply module. The comparing unit is coupled to the detection unit and is configured to compare the detecting voltage with a reference voltage to generate a control voltage. The power switch is coupled between the second end and the load. The power switch is also coupled to the comparing unit and is controlled by the control voltage. When the comparing unit determines that the detecting voltage is greater than the reference voltage, the comparing unit cuts off the power switch to disconnect a power supply path between the power supply module and the load.

An exemplary embodiment of the present disclosure provides a mainboard. The mainboard is coupled to a power supply module. The mainboard comprises a load and an overcurrent protection circuit. The overcurrent protection circuit and the load are disposed on the mainboard. The overcurrent protection circuit is coupled between the power supply module and the load and is configured to selectively connect or disconnect a power supply path between the power supply module and the load responsive to a supplying current outputted from the power supply module.

An exemplary embodiment of the present disclosure provides a server. The server comprises a power supply module and a mainboard. The power supply module is coupled to an AC power source and is configured for rectifying an AC voltage of the AC power source to generate a supplying voltage and a supplying current. The mainboard is coupled to the power supply module. The mainboard comprises a load and the aforementioned overcurrent protection circuit. The overcurrent protection circuit and the load are disposed on the mainboard to selectively connect or disconnect a power supply path between the power supply module and the load responsive to a supplying current outputted from the power supply module.

In an exemplary embodiment of the present disclosure, the aforementioned overcurrent protection circuit further comprises a soft-start unit. The soft-start unit is coupled between the comparing unit and the power switch. The soft-start unit is configured to turn on the power switch after a predetermined time.

In an exemplary embodiment of the present disclosure, the aforementioned detection unit further comprises a voltage detecting unit and a signal amplifying unit. The voltage detecting unit is respectively coupled to the first end and the second end of the detecting component for determining a voltage difference therebetween. The signal amplifying unit is coupled to the voltage detecting unit and is configured to amplify the determining result of the voltage detecting unit to generate the detecting voltage correspondingly.

To sum up, an exemplary embodiment of the present disclosure provides an overcurrent protection circuit which can be disposed between an input power terminal and a system load on a mainboard of a computing apparatus (e.g., a server, a disk storage system, a desktop computer, or a laptop computer). The overcurrent protection circuit can actively detect whether a supplying current from the input power terminal of the computing apparatus is too large, and disconnect a power supply path between the power supply module and the system load when the supplying current inputted the input power terminal is too large so as to prevent the system load from being damaged by over current.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the scope of the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The First Exemplary Embodiment

Figure 1:
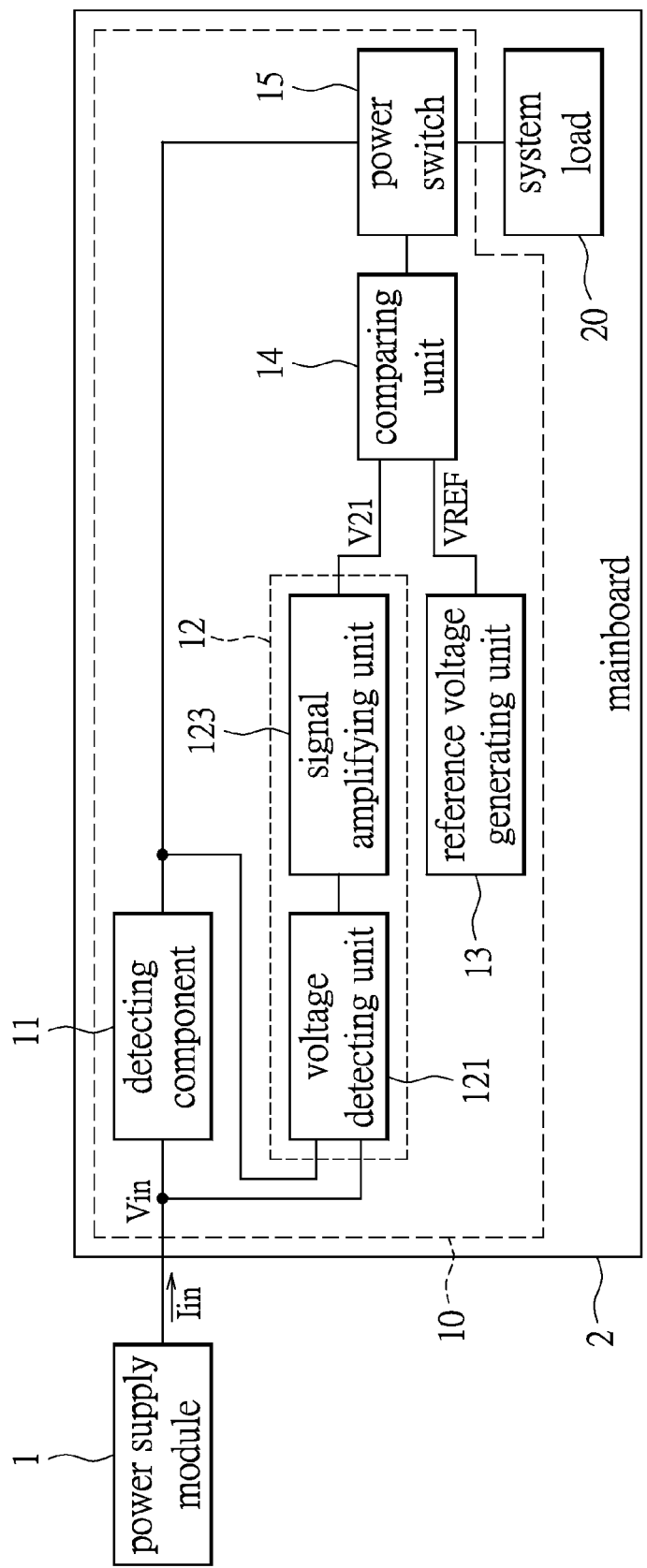
FIG. 1 is a block diagram of an overcurrent protection circuit provided in accordance with a first exemplary embodiment of the present disclosure.

Referring to FIG. 1, which shows a block diagram illustrating an overcurrent protection circuit provided in accordance with a first exemplary embodiment of the present disclosure. A power supply module 1 and a mainboard 2 are installed in a server (not shown in the figures). The power supply module 1 is coupled to the mainboard 2.

The power supply module 1 is configured for rectifying an AC voltage outputted form an AC power source (not shown in the figures) to generate a supplying voltage Vin powering each component on the mainboard 2. In the instant embodiment, the power supply module 1 is built-in in the server. The power supply module 1 is connected to the AC power source through a power port of the server for supplying power to the mainboard 2. In another implementation, the power supply module 1 may be implemented by an external power supply and connected to the power port of the server through a power line (not shown in the figures) for supplying power to the mainboard 2. Thus the present disclosure does not limit the exact types and the exact implementations associated with the power supply module 1.

The mainboard 2 has an overcurrent protection circuit 10 and a system load 20 disposed thereon. The overcurrent protection circuit 10 is coupled between the power supply module 1 and the system load 20. The overcurrent protection circuit 10 operatively determines whether a supplying current Iin too large, for example, detection of an inrush current condition, according to the supplying current Iin outputted from the power supply module 1. The overcurrent protection circuit 10 disconnects a power supply path between the power supply module 1 and the system load 20 to stop providing the supplying current Iin outputted from the power supply module 1 to the system load 20 upon determining that the supplying current Iin is too large (e.g., an inrush current has generated) so as to prevent the system load 20 from being damaged by over current.

In the instant exemplary embodiment, the system load 20 can represent all of the power consuming components on the mainboard 2 of the server including but not limited to a central processing unit (not shown in the figures), a system operation module (not shown in the figures), and peripheral devices (not shown in the figure). It should be noted that the exact structure implementations of the system load 20 may vary depend upon the exact type and the exact architecture of the server. The architectures associated with the system load 20 are not the main focus of the present disclosure, and are well-known to those skilled in the art, and further descriptions are hereby omitted.

Specifically, the overcurrent protection circuit 10 comprises a detecting component 11, a detection unit 12, a reference voltage generating unit 13, a comparing unit 14, and a power switch 15. The detecting component 11 is coupled between the power supply module 1 and the power switch 15. The detecting component 11 is further coupled to the detection unit 12. The detection unit 12 and the reference voltage generating unit 13 are coupled to the comparing unit 14, respectively. The comparing unit 14 is coupled to the power switch 15. The power switch 15 is coupled between the detecting component 11 and the system load 20.

The supplying current Iin outputted from the power supply module 1 correspondingly generate voltage drop across the detecting component 11 for the detection unit 12 to detect the magnitude of the supplying current Iin. In the instant embodiment, the detecting component 11 is a resistive element such as a resistor, however, the present embodiment is not limited thereto. The detecting component 11 has a first end and a second end. The detecting component 11 outputs voltages V1 and V2 respectively generated on the first end and the second end of the detecting component 11 to the detection unit 12 responsive to the supplying current Iin being outputted from the power supply module 1.

The detection unit 12 is configured to generate a detecting voltage V21 correspondingly according to the supplying current Iin outputted from the power supply module 1. Particularly, the detection unit 12 correspondingly generates the detecting voltage V21 based on the voltage difference between the first end and the second end of the detecting component 11.

Specifically, the detection unit 12 further comprises a voltage detecting unit 121 and a signal amplifying unit 123. The voltage detecting unit 121 is coupled to the detecting component 11 and the signal amplifying unit 123. The signal amplifying unit 123 is coupled to the comparing unit 14.

The voltage detecting unit 121 detects and outputs the voltage difference between the first end and the second end of the detecting component 11 (i.e., the voltage drop of the detecting component 11) according to the voltage V1 and the voltage V2 respectively received therefrom. In the instant embodiment, the voltage drop across the detecting component 11 is proportional to the magnitude of the supplying current Iin. In other words, when the supplying current Iin increases, the voltage drop across the detecting component 11 increases; when the supplying current Iin decreases, the voltage drop across the detecting component 11 decreases, accordingly. The signal amplifying unit 123 is configured for amplifying the determining result outputted from the voltage detecting unit 121 based on a predetermined gain so as to generate the detecting voltage V21.

The reference voltage generating unit 13 is used for generating and providing a reference voltage VREF to the comparing unit 14 for comparing with the detecting voltage V21. In the instant embodiment, the reference voltage VREF may be configured according to a predetermined current and the detecting component 11. Particularly, the predetermined current may be a base value used for determining whether an inrush current condition has occurred or the magnitude of the supplying current Iin is too large.

For example, the predetermined current can be configured according to the maximum current limit or the maximum power consumption of the system load 20. The reference voltage VREF may thus be the voltage drop across the detecting component 11 responsive to the predetermined current value. Accordingly, when the voltage drop across the detecting component 11 responsive to the supplying current Iin (i.e., V2−V1) is greater than the reference voltage VREF, indicating that the current of the supplying current Iin is greater than the predetermined current.

The comparing unit 14 is configured for generating a control voltage according to the detecting voltage V21 and the reference voltage VREF. In other words, the comparing unit 14 compares the detecting voltage V21 with the reference voltage VREF, and generates the control voltage according to the difference therebetween to control the operations of the power switch 15.

When the comparing unit 14 determines that the detecting voltage V21 is less than the reference voltage VREF indicating that the supplying current Iin is less than the predetermined current (e.g., the supplying current Iin is not too large). The comparing unit 14 outputs the control voltage (e.g., the control voltage with low voltage level) to turn on the power switch 15 establishing the power supply path from the power supply module 1 to the system load 20 for supplying the power generated from the power supply module 1 to the system load 20. That is, the supplying voltage Vin and the supplying current Iin outputted from the power supply module 1 are supplied to the system load 20 through the power switch 15 to drive the operation of the system load 20.

When the comparing unit 14 determines that the reference voltage VREF is less than the detecting voltage V21, indicates that the supplying current Iin is greater than the predetermined current (e.g., the supplying current Iin is too large). The comparing unit 14 outputs the control voltage (e.g., the control voltage with high voltage level) to cut off the power switch 15 disconnecting the power supply path from the power supply module 1 to the system load 20 to stop supplying the power generated from the power supply module 1 to the system load 20. That is, when the supplying current Iin is determined to be too large for the system load 20, the comparing unit 14 actively cuts off the power switch 15 to prevent the system load 20 from being damaged by over current.

Accordingly, when inrush current generated the instant the power supply module 1 connects to the AC power source, the detecting voltage V21 generated by the detection unit 12 of the overcurrent protection circuit 10 responsive to the supplying current Iin from the power supply module 1 would be greater than the reference voltage VREF, such that the comparing unit 14 outputs the control voltage cutting off the power switch 15 to prevent the system load 20 from being damaged by the instantaneous inrush current. Then, when the supplying current Iin from the power supply module 1 becomes stabilized, the detecting voltage V21 generated by the detection unit 12 responsive to the supplying current Iin from the power supply module 1 would be less than the reference voltage VREF. At this time, the comparing unit 14 outputs the control voltage turning on the power switch 15 to supply the power generated to the system load 20 from the power supply module 1.

Figure 2:
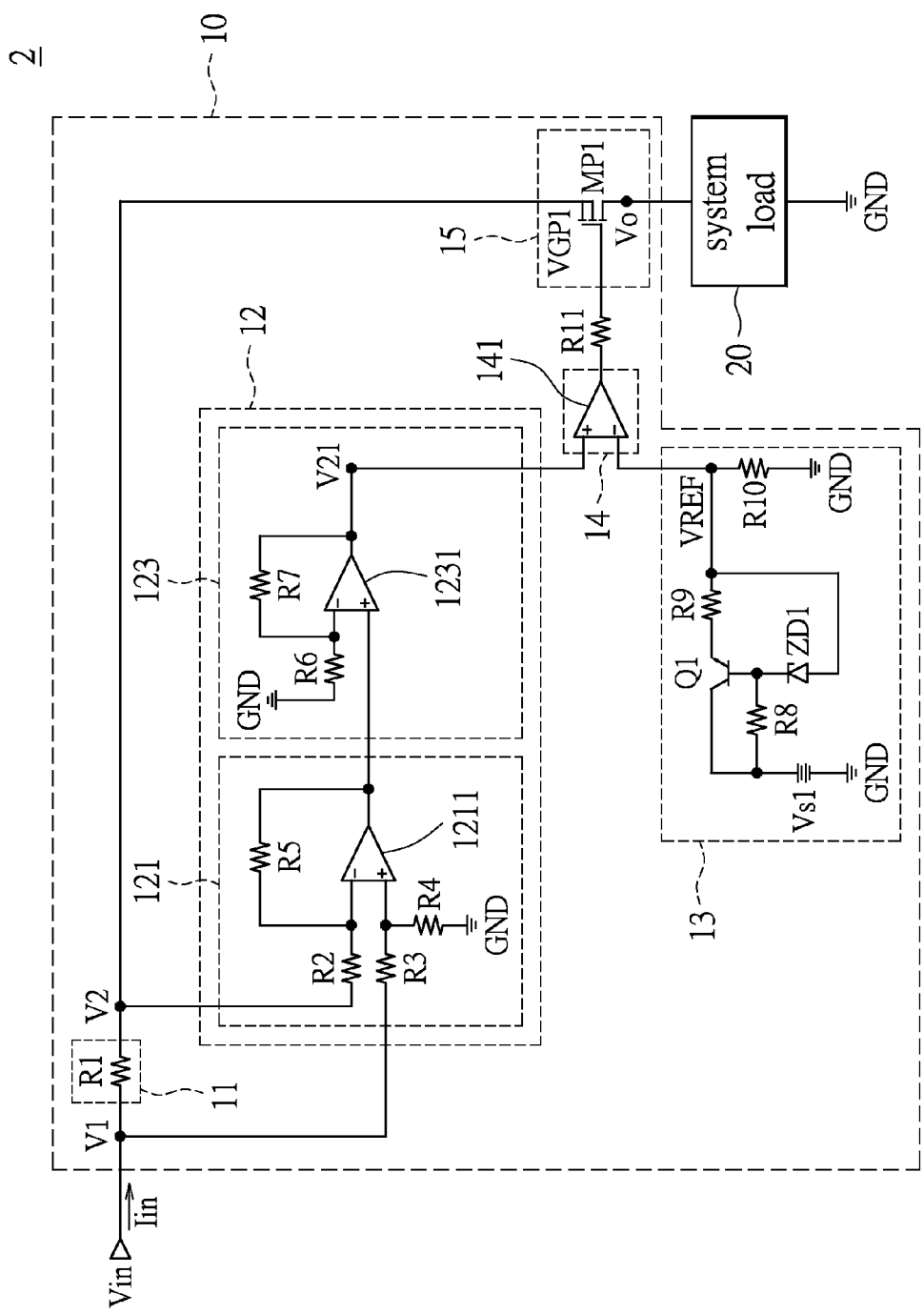
FIG. 2 is a schematic diagram of the overcurrent protection circuit provided in accordance with the first exemplary embodiment of the present disclosure.

A practical implementation and circuit operation for the overcurrent protection circuit 10 are described in the following paragraphs. Referring to FIG. 1 and FIG. 2 at the same time, wherein FIG. 2 shows a schematic diagram illustrating the overcurrent protection circuit provided in accordance with the first exemplary embodiment of the present disclosure.

In the instant embodiment, the detecting component 11 includes a resistor R1. The voltage detecting unit 121 includes a voltage subtractor 1211 and resistors R2~R5. The signal amplifying unit 123 includes a voltage amplifier 1231, resistor R6, and resistor R7. The reference voltage generating unit 13 includes a transistor Q1, resistors R8~R10, a zener diode ZD1, and a voltage source Vs1. The comparing unit 14 includes a comparator 141. The power switch 15 includes a PMOS transistor MP1.

The resistor R1 is coupled between the power supply module 1 and the PMOS transistor MP1. A first end of the resistor R1 is coupled to an output of the power supply module 1. The second end of the resistor R1 is coupled to a source of the PMOS transistor MP1. The voltage V1 at the first end of the resistor R1 is equal to the supplying voltage Vin outputted from the power supply module 1. The voltage V2 at the second end of the resistor R1 is equal to the supplying voltage Vin subtract the voltage drop across the resistor R1 responsive to the supplying current Iin (i.e., the supplying current Iin×the resistance of the resistor R1). Accordingly, the supplying current Iin from the power supply module 1 can generate voltage drop across the resistor R1 for the detection unit 12 and the comparing unit 14 to detect and determine the magnitude of the supplying current Iin.

The first end of the resistor R1 is further coupled to a non-inverting input terminal of the voltage subtractor 1211 through the resistor R3 to output the voltage V1 to the non-inverting input terminal of the voltage subtractor 1211. The second end of the resistor R1 is further coupled to the inverting input terminal of the voltage subtractor 1211 through the resistor R2 to output the voltage V2 to the inverting input terminal of the voltage subtractor 1211. The non-inverting input terminal of the voltage subtractor 1211 is further coupled to a first end of the resistor R4. A second end of the resistor R4 is coupled to a ground GND. That is, the non-inverting input terminal of the voltage subtractor 1211 is coupled to the ground GND through the resistor R4. The inverting input terminal of the voltage subtractor 1211 is coupled to a first end of the resistor R5. A second end of the resistor R5 is coupled to an output terminal of the voltage subtractor 1211. That is, the inverting input terminal of the voltage subtractor 1211 is coupled to the output end of the voltage subtractor 1211 through the resistor R5.

Those skilled in the art shall know that the voltage outputted by the output terminal of the subtractor 1211 is equal to the voltage V1 subtracted from the voltage V2. In other words, the voltage subtracting circuit formed of resistors R2~R5 and the voltage subtractor 1211 can be configured for computing the voltage difference between the voltage V1 and the voltage V2, i.e., the voltage drop across the resistor R1. It should be noted that in practice, the voltage subtractor 1211 may be implemented by an operational amplifier while resistors R2~R5 are implemented with identical resistors e.g., 10 ohm (Ω) resistors.

The non-inverting input terminal of the voltage amplifier 1231 is coupled to the output terminal of the voltage subtractor 1211 and the second end of the resistor R5 to receive the output voltage V21. The inverting input terminal of the voltage amplifier 1231 is coupled to a first end of the resistor R6. A second of the resistor R6 is coupled to the ground GND. That is, the inverting input terminal of the voltage amplifier 1231 is coupled to the ground GND through the resistor R6. The inverting input terminal of the voltage amplifier 1231 and the second end of the resistor R6 are further coupled to a first end of the resistor R7. A second end of the resistor R7 is coupled to the output terminal of the voltage amplifier 1231. That is, the inverting input terminal of the voltage amplifier 1231 is coupled to the output terminal of the voltage amplifier 1231 through the resistor R7. The output terminal of the voltage amplifier 1231 is further coupled to the non-inverting input terminal of the comparator 141.

Accordingly, the voltage amplifier 1231 can amplify the output voltage V21 received at the non-inverting input terminal thereof by a predetermined gain (i.e., 1+[resistance of the resistor R7/resistance of the resistor R6]) to generate and output the detecting voltage V21 to the comparator 141. In practice, the voltage amplifier 1231 may be, for example, a non-inverting amplifier which can be implemented by an operational amplifier. The resistors R6 and R7 can be designed according to the gain required by the non-inverting amplifier. The circuit design for the non-inverting amplifier is well-known technique for those skilled in the art, and hence further descriptions are hereby omitted.

A collector of the transistor Q1 is coupled to a positive terminal of the voltage source Vs1. The negative terminal of the voltage source Vs1 is coupled to the ground GND. The collector of the transistor Q1 is further coupled to a first end of the resistor R8. A second end of the resistor R8 is coupled to a base of the transistor Q1. The resistor R8 can be used to limit the current flowing into the base of the transistor Q1 to prevent the transistor Q1 from being damage by excessive current affecting the operation of the reference voltage generating unit 13.

The base of the transistor Q1 is coupled to a cathode of the zener diode ZD1. An anode of the zener diode ZD1 is coupled to an emitter of the transistor Q1. The resistor R9 is coupled between the emitter of the transistor Q1 and the anode of the zener diode ZD1. A first end of the resistor R10 is coupled to a junction between the resistor R9 and the anode of the zener diode ZD1. A second end of the resistor R10 is coupled to the ground GND. The junction between the resistor R9 and the anode of the zener diode ZD1 is further coupled to the inverting input terminal of the comparator 141 for outputting the reference voltage VREF to the comparator 141. It is known that when the zener diode is reverse biased, the zener diode can stably operate at its reverse breakdown voltage Hence, in the instant embodiment, the zener diode ZD1 can be used for stabilizing the voltage across the base and the emitter of the transistor Q1 to have the transistor Q1 constantly biased in the conducting state and stably supplying the reference voltage VREF to the comparator 141 through the junction between the resistor R9 and the anode of the zener diode ZD1. The voltage source Vs1 of the reference voltage generating unit 13 is configured for driving the zener diode ZD1 to constantly operate at the reverse breakdown voltage thereof while the overcurrent protection circuit 10 operates.

Those skilled in the art should know that the reference voltage VREF can be configured by appropriately designing the voltage of the voltage source Vs1 and resistances of the resistors R9 and R10. In other words, the reference voltage VREF can be configured according to aforementioned predetermined current and implemented by designing the circuit structure of the reference voltage generating unit 13 (i.e., the voltage of the reference voltage VREF, the resistor R9 and the resistor R10). Incidentally, the voltage source Vs1 may be implemented by utilizing the supplying voltage Vin of the power supply module 1 with a voltage division circuit or a voltage regulating element (e.g., the zener diode ZD1) using the supplying voltage Vin of the power supply module 1, and the present disclosure is not limited thereto.

Additionally, in the instant embodiment, the transistor Q1 is implemented by a NPN bipolar transistor, however the present disclosure is not limited thereto. Those skilled in the art can select the type and specifications of the transistor Q1 according to the operational requirement.

As previously described, the non-inverting input terminal of the comparator 141 is coupled to the output terminal of the voltage amplifier 1231. The inverting input terminal of the comparator 141 is coupled to the junction between the resistor R9 and the anode of the zener diode ZD1. The output terminal of the comparator 141 is coupled to a first end of the resistor R11. A second end of the resistor R11 is coupled to a gate of the PMOS transistor MP1. The output terminal of the comparator 141 is coupled to the gate of the PMOS transistor MP1 through the resistor R11 to control the on/off operations of the PMOS transistor MP1. The resistor R11 is configured for limiting the amount of current flowing into the gate of the PMOS transistor MP1. The source of the transistor MP1 is coupled to the output terminal of the power supply module 1 through the resistor R1. The drain of the PMOS transistor MP1 is coupled to the system load 20. The system load 20 is coupled between the PMOS transistor MP1 and the ground GND.

The comparator 141 detects the voltage difference between the detecting voltage V21 and the reference voltage VREF to correspondingly output the control voltage turning on or cutting off the PMOS transistor MP1.

When detectes that the detecting voltage V21 is greater than the reference voltage VREF, the comparator 141 outputs the control voltage (e.g., the control voltage with high voltage level) such that the gate voltage VGP1 of the PMOS transistor MP1 is at the high voltage level and causes the PMOS transistor MP1 to cut off as the voltage difference between the source and the gate of the PMOS transistor MP1 is lower than the threshold voltage of the PMOS transistor MP1. When detects that the detecting voltage V21 is less than the reference voltage VREF, the comparator 141 outputs the control voltage (e.g., the control voltage with low voltage level) such that the gate voltage VGP1 of the PMOS transistor MP1 is at the low voltage level and cause the PMOS transistor MP1 to turn on as the voltage difference between the source and the gate of the PMOS transistor MP1 is greater than the threshold voltage of the PMOS transistor MP1.

In particular, when the PMOS transistor MP1 is turned on, the power supply path from the power supply module 1 to the system load 20 through the resistor R1 and the source-drain of the PMOS transistor MP1 is established and generates an output voltage Vo at the drain of the PMOS transistor MP1 to drive the system load 20. When the PMOS transistor MP1 cuts off, the power supply path from the power supply module 1 to the system load 20 is disconnected to stop supplying the supplying current Iin to the system load 20 from the power supply module 1 for preventing the system load 20 from being damaged by over current.

Figure 3:
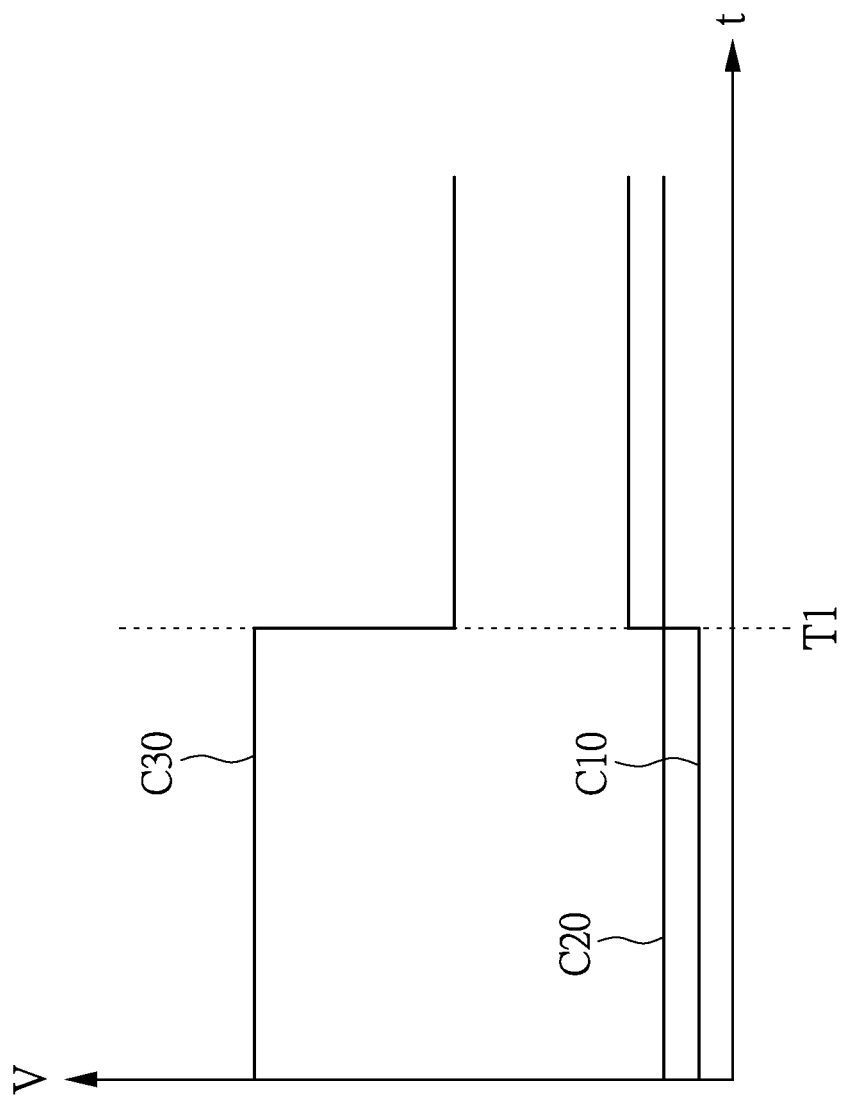
FIG. 3 is a waveform diagram illustrating the operation of the overcurrent protection circuit provided in accordance with the first exemplary embodiment of the present disclosure.

The operation of the overcurrent protection circuit 10 of FIG. 2 is described in detail in the following paragraphs. Referring to FIG. 2 and FIG. 3 at the same time, wherein FIG. 3 shows a waveform diagram illustrating the circuit operation of the overcurrent protection circuit provided in accordance with the first exemplary embodiment of the present disclosure. Curve C10 represents the voltage waveform of the detecting voltage V21. Curve C20 represents the voltage waveform of the reference voltage VREF. Curve C30 represents the voltage waveform of the output voltage Vo at the drain of the PMOS transistor MP1.

Whenever the power supply module 1 outputs the supplying current Iin, the resistor R1 generates voltages V1 and V2 immediately at the first end and the second end of the resistor R1 to the voltage subtractor 1211 upon detecting the supplying current Iin for computing voltage drop across the resistor R1. The voltage subtractor 1211 computes and outputs the voltage difference between the voltages V1 and V2 to the voltage amplifier 1231. The voltage amplifier 1231 amplifies the voltage difference by a predetermined gain and generates the detecting voltage V21 to the comparator 141 to determine the magnitude of the supplying current Iin.

As depicted by curves C10 and C30 before the time point T1 in FIG. 3, when no inrush current has generated, the detecting voltage V21 is less than the reference voltage VREF. The comparator 141 operatively outputs the control voltage with low voltage level turning on the PMOS transistor MP1. The PMOS transistor MP1 generates the output voltage Vo at the drain driving the system load 20. When the supplying current Iin becomes too large at the time point T1 (e.g., the inrush current has generated at the instant when the power supply module 1 plugs in to a power source), the detecting voltage V21 becomes greater than the reference voltage VREF. The comparator 141 operatively outputs the control voltage with high voltage level cutting off the PMOS transistor MP1 to disconnect the power supply path from the power supply module 1 to the system load 20 to stop supplying the supplying current Iin to the system load 20 from the power supply module 1. At this time, as depicted by Curve C30 after the time point T1 in FIG. 3, the output voltage Vo at the drain of the PMOS transistor MP1 is at low voltage level as being pull-down to the ground GND.

Accordingly, the overcurrent protection circuit 10 of the instant embodiment can operatively prevent the system load 20 from being damaged either by the inrush current generated the startup of the power supply module 1 or by the overcurrent condition as result of an abnormal operation.

It should be noted that in the instant embodiment, the PMOS transistor MP1 is utilized by the overcurrent protection circuit 10 as a power switch for the system load 20 on the mainboard 2. It is well known that to turn on an NMOS transistor, an additional boosting circuit is required whereas the PMOS transistor MP1 can be turned on by pulling down the gate voltage of the PMOS transistor MP1.

Furthermore, the overcurrent protection circuit 10 in the instant embodiment is used in the server as described above. However, in practice the overcurrent protection circuit 10 may be used in other computing devices such as a disk storage system, a desktop computer, or a laptop computer and the present disclosure is limited thereto.

It should be noted that FIG. 2 is merely used to illustrate a circuit implementation for the overcurrent protection circuit provided in accordance with the exemplary embodiment of the present disclosure, and the present disclosure is not limited thereto. Similarly, FIG. 3 merely serves to illustrate a circuit operation of the overcurrent protection circuit provided in accordance with the exemplary embodiment of the present disclosure, and the present disclosure is not limited thereto. In addition, the present disclosure does not limit the exact type, the exact circuitry structure, the exact implementations and/or the exact connections associated with the detecting component 11, the detection unit 12, the reference voltage generating unit 13, the comparing unit 14 and the power switch 15 depends on specific design and/or operational requirement and shall not be limited to the examples provided by the instant embodiment.

The Second Exemplary Embodiment

The aforementioned overcurrent protection circuit may further comprise a soft-start unit to delay the turn-on time of the power switch. In short, by using the soft-start unit controlling the turn-on operation of the power switch, the supplying current Iin outputted to the system load can be configured to increase slowly to a rated load current according to a designed slope. When the supplying current Iin becomes stable, the power switch is turned on to supply the power to the system load from the power supply module 1 so as to prevent the system load from being damaged by the inrush current generated at the instant the power supply module 1 is powered on.

Figure 4:
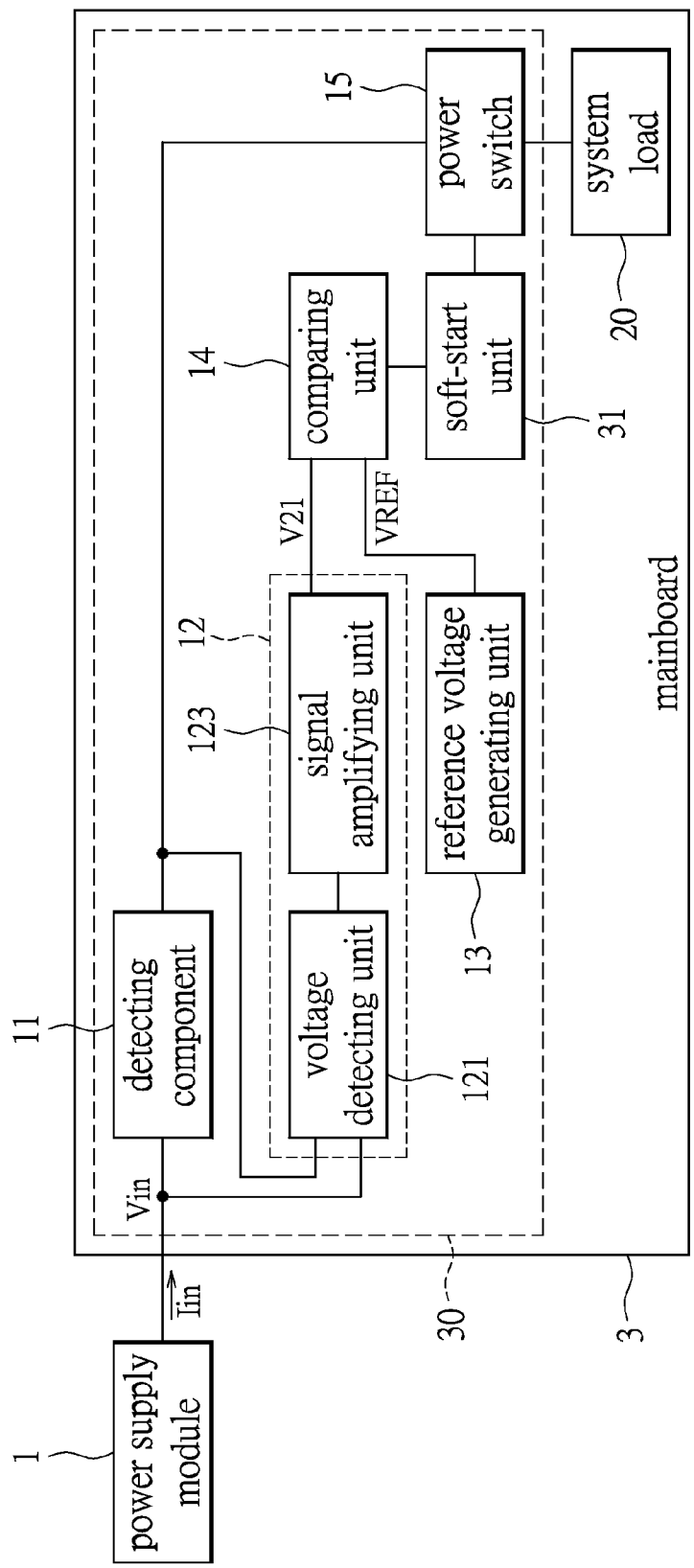
FIG. 4 is a block diagram of an overcurrent protection circuit provided in accordance with a second exemplary embodiment of the present disclosure.

Referring to FIG. 4, which shows a block diagram illustrating an overcurrent protection circuit provided in accordance with a second exemplary embodiment of the present disclosure. The overcurrent protection circuit 30 and the system load 20 are disposed on a mainboard 3. The mainboard 3 is installed in a server (not shown in the figure). The power supply module 1 is coupled to the mainboard 3.

The difference between FIG. 4 and FIG. 1 is in the circuit structure of the overcurrent protection circuit 10. In the instant exemplary embodiment, the overcurrent protection circuit 30 further comprises a soft-start unit 31. The soft-start unit 31 is coupled between the comparing unit 14 and the power switch 15. The soft-start unit 31 is configured for delaying the turn-on time of the power switch 15.

Particularly, the soft-start unit 31 is configured to turn on the power switch 15 after a predetermined time upon receiving the control voltage outputted by the comparing unit 14 when the comparing unit 14 determines that the detecting voltage V21 is less than the reference voltage VREF. Namely, the soft-start unit 31 starts to count the predetermined time upon receiving the control voltage. After the soft-start unit 31 finishes counting the predetermined time, the soft-start unit 31 turns on the power switch 15 to connect the power supply path between the power supply module 1 to the system load 20 for supplying the supplying voltage Vin and the supplying current Iin to the system load 20 from the power supply module 1. In the instant embodiment, the predetermined time may be determined according to the rise time required for the supplying current Iin outputted by the power supply module 1 i.e., the time required for the supplying current Iin to stabilize.

Briefly, When the supplying current Iin is not stable at the startup of the power supply module 1, the soft-start unit 31 of the overcurrent protection circuit 30 can delay the turn-on time of the power switch 15 until the supplying current Iin is stabilized so as to prevent the system load 20 from being damaged by a large unstable supplying current Iin outputted by the power supply module 1.

The operation of the overcurrent protection circuit 30 of FIG. 4 is essentially the same as the overcurrent protection circuit 10 of FIG. 1. Based on the above elaborations, those skilled in the art shall be able to infer the operation of the overcurrent protection circuit 30, and hence further descriptions are hereby omitted.

Figure 5:
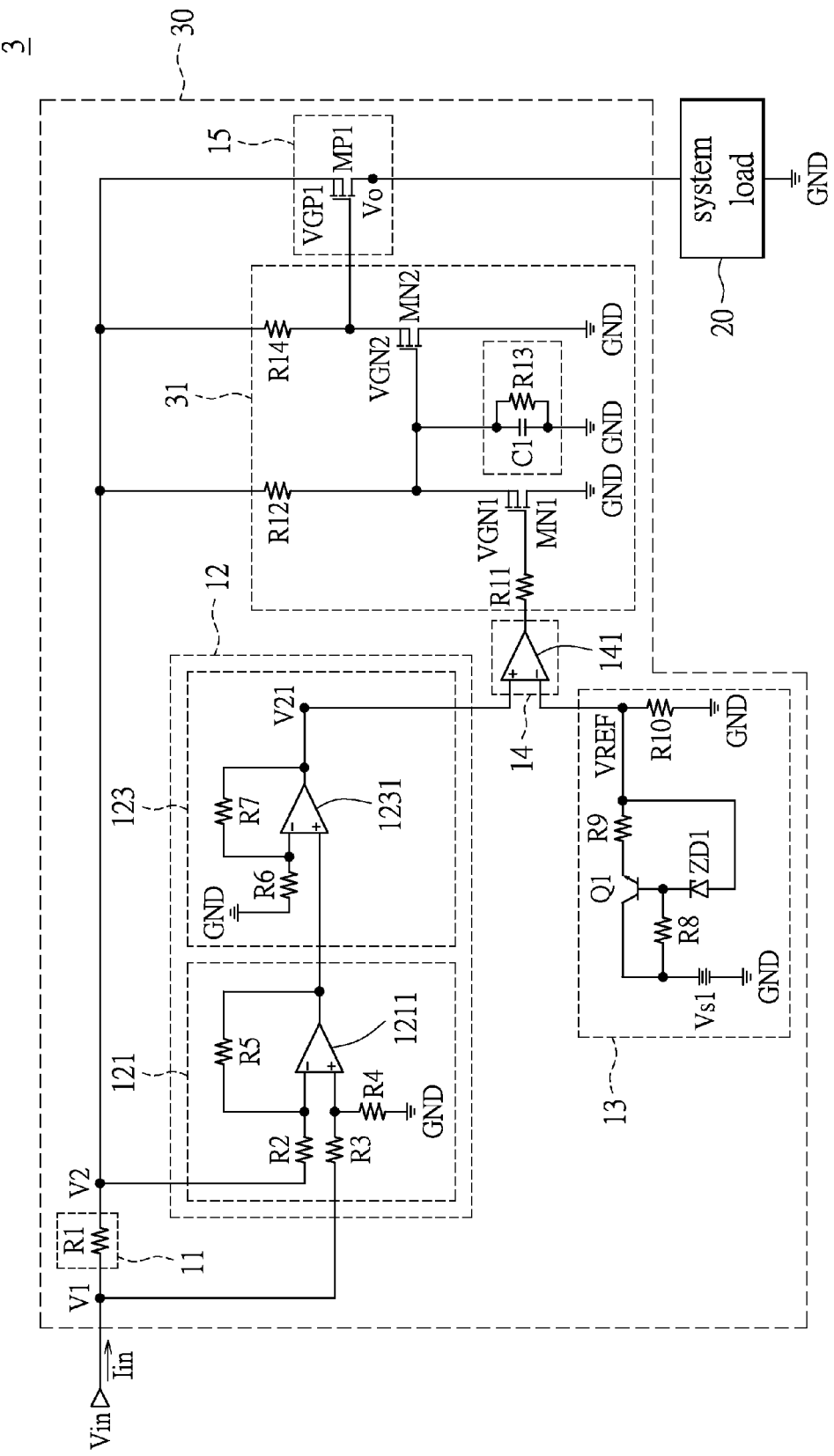
FIG. 5 is a schematic diagram of the overcurrent protection circuit provided in accordance with the second exemplary embodiment of the present disclosure.
Figure 6:
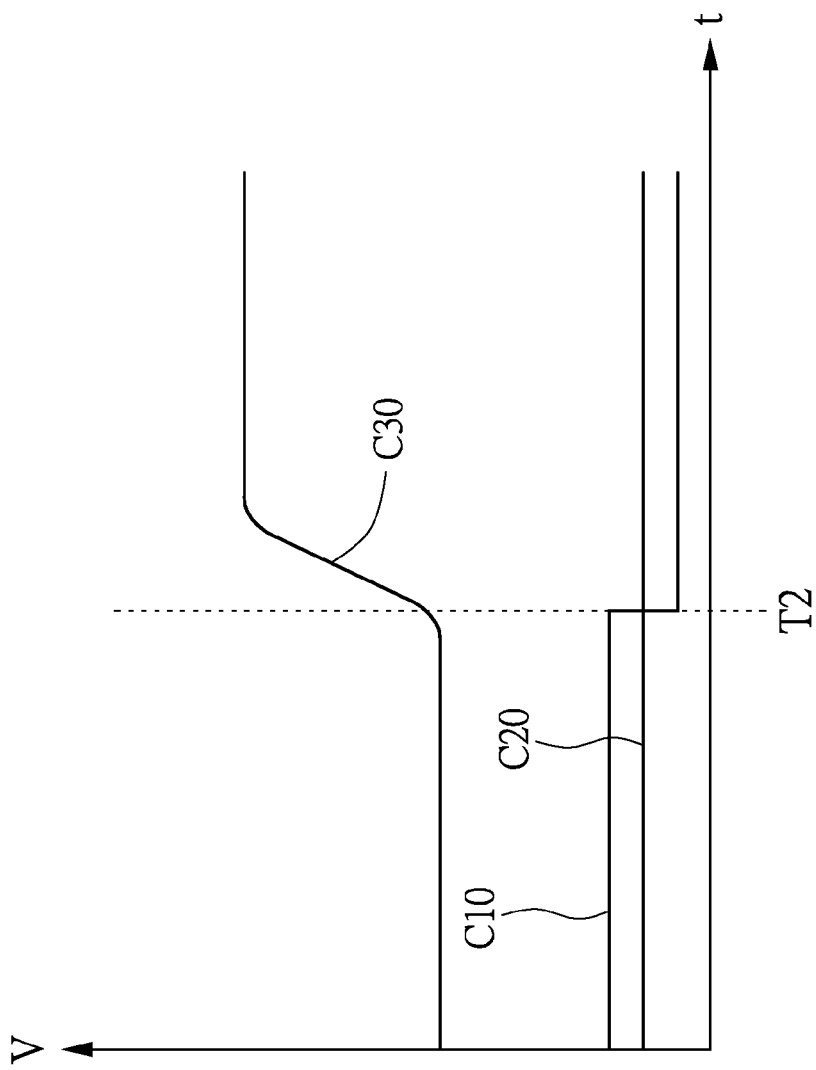
FIG. 6 is a waveform diagram illustrating the operation of the overcurrent protection circuit provided in accordance with the second exemplary embodiment of the present disclosure.

A circuit implementation for the soft-start unit 31 and the operation of the overcurrent protection circuit 30 are detailed described in the following paragraphs. Referring to FIG. 5 and FIG. 6 at the same time, FIG. 5 shows a schematic diagram illustrating the overcurrent protection circuit provided in accordance with the second exemplary embodiment of the present disclosure. FIG. 6 shows a waveform diagram illustrating the operation of the overcurrent protection circuit provided in accordance with the second exemplary embodiment of the present disclosure. Curve C10 herein represents the voltage waveform of the detecting voltage V21. Curve C20 herein represents the voltage waveform of the reference voltage VREF. Curve C30 herein represents the voltage waveform of the output voltage Vo at the drain of the PMOS transistor MP1.

Particularly, the soft-start unit 31 comprises NMOS transistors MN1 and MN2, resistors R12~R14, and a capacitor C1. A gate of the NMOS transistor MN1 is coupled to the second end of the resistor R11 to receive the control voltage. A drain of the NMOS transistor MN1 is coupled to the second end of the resistor R11 through the resistor R12. A source of the NMOS transistor MN1 is coupled to the ground GND.

A gate of the NMOS transistor MN2 is coupled to the drain of the NMOS transistor MN1. The gate of the NMOS transistor MN2 is further coupled to a first end of the capacitor C1. A second end of the capacitor C1 is coupled to the ground GND. A first end of the resistor R13 is also coupled to the gate of the NMOS transistor MN2. A second end of the resistor R13 is coupled to the ground GND. The resistor R13 is connected to the capacitor C1 in parallel. Or equivalently, the gate of the NMOS transistor MN2 is coupled to a RC circuit comprising of the resistor R13 and the capacitor C1 connected in parallel.

A drain of the NMOS transistor MN2 is coupled to the second end of the resistor R1 through the resistor R14. The drain of the NMOS transistor MN2 is further coupled to the gate of the PMOS transistor MP1 to control the on/off operations of the PMOS transistor MP1. The source of the NMOS transistor MN2 is coupled to the ground GND.

Specifically, when the comparator 141 determines that the detecting voltage V21 is greater than the reference voltage VREF, the comparator 141 outputs the control voltage with high voltage level so that the gate voltage VGN1 of the NMOS transistor MN1 is at high voltage level. The NMOS transistor MN1 at this time turns on as the voltage difference between the gate and the source of the NMOS transistor MN1 is greater than the threshold voltage of the NMOS transistor MN1 and pulls down the gate voltage VGN2 of the NMOS transistor MN2 to turn off the NMOS transistor MN2. Meanwhile, the gate voltage VGP1 of the PMOS transistor MP1 is pull high voltage level (e.g., the voltage V2 at the second end of the resistor R1) as the NMOS transistor MN2 turns off causing the voltage difference between the gate and the source of the PMOS transistor MP1 be less than the threshold voltage of the PMOS transistor MP1 to turn off the PMOS transistor MP1.

When the comparator 141 determines that the detecting voltage V21 is less than the reference voltage VREF (e.g., at the time point T2 in FIG. 6), the comparator 141 outputs the control voltage with low voltage level to turn off the NMOS transistor MN1 since the voltage difference between the gate and the source of the NMOS transistor MN1 is less than the threshold voltage of the NMOS transistor MN1. At this time, the supplying current Iin from the power supply module 1 starts to charge the capacitor C1 via the resistor R1 and the resistor R12. When the capacitor C1 is completely charged causing the gate voltage VGN2 of the NMOS transistor MN2 to increase to a high voltage level, such that the voltage difference between the gate and the source of the NMOS transistor MN2 is greater than the threshold voltage of the NMOS transistor MN2. At this time, the gate voltage of the PMOS transistor MP1 is pulled down to the ground GND as to the NMOS transistor MN2 turns on, causing the PMOS transistor MP1 to turn on as the voltage difference between the gate and the source of the PMOS transistor MP1 is greater than the threshold voltage of the PMOS transistor MP1 to generate the output voltage Vo at the drain of the PMOS transistor MP1. When the PMOS transistor MP1 is turned on, the power supply path from the power supply module 1 to the system load 20 is formed and the supplying power generated from the power supply module 1 is supplied to the system load 20 through the power supply path.

In other words, when the detecting voltage V21 is less than the reference voltage VREF, the PMOS transistor MP1 turns on along the charging time of the capacitor C1 to gradually build up the output voltage Vo at the drain of the PMOS transistor MP1 as depicted by Curve C30 in FIG. 6. The charging time of the capacitor C1 is determined by the capacitor C1, the resistor R12, and the resistor R13. Additionally, the charging time of the capacitor C1 also corresponds the aforementioned predetermined time, i.e., the rise time of the supplying current Iin. Those skilled in the art shall be able to choose the appropriate capacitor C1, resistor R12 and resistor R13 to design the charging circuit formed the capacitor C1, the resistor R12, and the resistor R13, and hence further descriptions are hereby omitted.

The rest of circuit structures associated with the overcurrent protection circuit 30 in FIG. 5 are essentially the same as the overcurrent protection circuit 10 in FIG. 2. Based on the absolve elaborations, those skilled in the art shall able to infer the operation of the overcurrent protection circuit 30, and hence further descriptions are hereby omitted. In addition, the overcurrent protection circuit 30 may be also used in other computing devices such as a disk storage system, a desktop computer or a laptop computer and the present disclosure is not limited thereto.

It should be noted that FIG. 5 merely illustrates a circuit implementation for the overcurrent protection circuit provided in accordance with the second exemplary embodiment of the present disclosure, and the present disclosure is not limited thereto. Similarly, FIG. 6 merely shows an exemplary waveform diagram illustrating the operation of the overcurrent protection circuit provided in accordance with the second exemplary embodiment of the present disclosure, and the present disclosure is not limited thereto. In addition, the exact type, actual circuitry structure, implementation method and/or connection method associated with the detecting component 11, the detection unit 12, the reference voltage generating unit 13, the comparing unit 14, the soft-start unit 31, and the power switch 15 depends on specific design and/or operational requirement and shall not be limited to the examples provided by the instant embodiment.

It should be noted that the coupling connections among the elements in the aforementioned embodiments include direct or indirect electrical connections and the scope of the present invention does not limit the type of connection employed as long as the choice type of connection selected is able to fulfill the electrical signal transmission functionality. The technical means described in the aforementioned embodiments may be used independently or in combination. The associated elements may be added, removed, adjusted, or replaced depending on the specific functional the design requirements, and the present disclosure is not limited thereto. In view of the descriptions of the aforementioned embodiments, those skilled in the art should be able to deduce other implementations according to the disclosure of the present invention, and hence further descriptions are hereby omitted.

In summary, the exemplary embodiments of the present disclosure provide an overcurrent protection circuit. The overcurrent protection circuit can be disposed between a system load and an input power source on a mainboard of a computing device (e.g., a server, a disk storage system, a desktop computer, a laptop computer etc.). The overcurrent protection circuit can actively detect whether a supplying current from the input power source of the computing device is too large, and disconnects a power supply path between the input power terminal and the system load when the supplying current from the input power source is too large to stop supplying the supplying power to the system load from the input power source. Accordingly, the overcurrent protection circuit can prevent the system load from being damaged by over current while attain the efficacies of protecting the system load on the mainboard and maintain the operation of the computing device.

Moreover, the overcurrent protection circuit may further comprise a soft-start unit for supplying the power to the system load after the power from the input power source become stabilize so as to prevent the system load from being damaged by the large startup current (i.e., inrush current) when the power supply module just starts to supply power.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An overcurrent protection circuit disposed on a mainboard and configured to couple between a power supply module and a load on the mainboard, the overcurrent protection circuit comprising:
    a detecting component having a first end and a second end, the first end being coupled to the power supply module to receive a supplying current outputted from the power supply module;
    a detection unit coupled to the first end and the second end, respectively, the detection unit operatively detecting a detecting voltage generated by the detecting component responsive to the supplying current outputted from the power supply module, wherein the detection voltage is the voltage difference between the first end and the second end;
    a comparing unit coupled to the detection unit, configured to compare the detecting voltage with a reference voltage to generate a control voltage;
    a power switch coupled between the second end and the load, the power switch also coupled to the comparing unit and controlled by the control voltage; and
    a soft-start unit, being coupled between the comparing unit and the power switch, configured to turn on the power switch after a predetermined time;
    wherein when the comparing unit determines that the detecting voltage is greater than the reference voltage, the comparing unit cuts off the power switch and disconnects a power supply path between the power supply module and the load; and
    wherein the soft-start unit comprises:
        a first NMOS transistor, a drain of the first NMOS transistor being coupled to the second end of the detecting component, a source of the first NMOS transistor being coupled to a ground, and a gate of the first NMOS transistor being coupled to the comparing unit to receive the control voltage;
        a second NMOS transistor, a drain of the second NMOS transistor being coupled to the second end of the detecting component, a source of the second NMOS transistor being coupled to the ground, and a gate of the second NMOS transistor being coupled to the drain of the first NMOS transistor;
        a first capacitor, being coupled between the gate of the second NMOS transistor and the ground; and
        a seventh resistor, being coupled to the first capacitor in parallel.

2. The overcurrent protection circuit as claimed in claim 1, wherein when the comparing unit determines that the detecting voltage is less than the reference voltage, the comparing unit turns on the power switch to establish the power supply path and to supply a supplying voltage outputted from the power supply module to the load to drive the load.

3. The overcurrent protection circuit as claimed in claim 1, wherein the detection unit comprises:
    a voltage detecting coupled to the first end and the second end, respectively, and the voltage detecting unit configured to determine a voltage difference between the first end and the second end; and
    a signal amplifying unit coupled to the voltage detecting unit, operatively amplifying the determining result of the voltage detecting unit to generate the detecting voltage correspondingly.

4. The overcurrent protection circuit as claimed in claim 3, wherein the voltage detecting unit comprises:
    a voltage subtractor having a first input end, a second input end, and a first output end, the first input end being coupled to the first end, and the second input end being coupled to the second end and the first output end;
    a first resistor, being coupled between the first end and the first input end;
    a second resistor, being coupled between the second end and the second input end;
    a third resistor, being coupled between the first input end and a ground; and
    a fourth resistor, being coupled between the second input end and the first output end.

5. The overcurrent protection circuit as claimed in claim 4, wherein the signal amplifying unit comprises:
    a voltage amplifier having a third input end, a fourth input end, and a second output end, the third input end being coupled to the first output end of the voltage subtractor, the fourth input end being coupled to the second output end, and the second output end being further coupled to the comparing unit;
    a fifth resistor, being coupled between the fourth input end and the ground; and
    a sixth resistor, being coupled between the fourth input end and the second output end.

6. The overcurrent protection circuit as claimed in claim 5, wherein the comparing unit comprises a comparator having a fifth input end, a sixth input end, and a third output end, the fifth input end being coupled to the second output end, the sixth input end being configured to receive the reference voltage, and the third output end being configured for outputting the control voltage to the power switch.

7. The overcurrent protection circuit as claimed in claim 6, wherein the power switch is a PMOS transistor, a source of the PMOS transistor being coupled to the second end of the detecting component, a drain of the PMOS transistor being coupled to the load, and a gate of the PMOS transistor being coupled to the comparing unit to receive the control voltage.

8. The overcurrent protection circuit as claimed in claim 6, wherein the detecting component is a resistor.

9. The overcurrent protection circuit as claimed in claim 1, wherein the power switch is a PMOS transistor, a source of the PMOS transistor being coupled to the second end of the detecting component, a drain of the PMOS transistor being coupled to the load, and a gate of the PMOS transistor being coupled to the comparing unit to receive the control voltage.

10. The overcurrent protection circuit as claimed in claim 1, wherein the detecting component is a resistor.

11. A server, comprising:
    a power supply module coupled to an AC power source, configured for rectifying an AC voltage of the AC power source to generate a supplying voltage and a supplying current; and
    a mainboard coupled to the power supply module, the mainboard comprising: a load; and an overcurrent protection circuit coupled between the power supply module and the load, the overcurrent protection circuit comprising:
  a detecting component having a first end and a second end, the first end coupled to the power supply module to receive the supplying current outputted from the power supply module;
  a detection unit coupled to the first end and the second end, respectively, the detection unit operatively detecting a detecting voltage generated by the detecting component responsive to the supplying current outputted from the power supply module, wherein the detection voltage is the voltage difference between the first end and the second end;
  a comparing unit coupled to the detection unit, configured to compare the detecting voltage with a reference voltage to generate a control voltage;
  a power switch coupled between the second end and the load, the power switch also coupled to the comparing unit and being controlled by the control voltage; and
  a soft-start unit coupled between the comparing unit and the power switch and configured to turn on the power switch after a predetermined time;
  wherein when the comparing unit determines that the detecting voltage is greater than the reference voltage, the comparing unit cuts off the power switch and disconnects a power supply path between the power supply module and the load; and
  wherein the soft-start unit comprises:
    a first NMOS transistor, a drain of the first NMOS transistor being coupled to the second end of the detecting component, a source of the first NMOS transistor being coupled to a ground, and a gate of the first NMOS transistor being coupled to the comparing unit to receive the control voltage;
    a second NMOS transistor, a drain of the second NMOS transistor being coupled to the second end of the detecting component, a source of the second NMOS transistor being coupled to the ground, and a gate of the second NMOS transistor being coupled to the drain of the first NMOS transistor;
    a first capacitor, being coupled between the gate of the second NMOS transistor and the ground; and
    a seventh resistor, being coupled to the first capacitor in parallel.

12. The server as claimed in claim 11, wherein the detection unit comprises:
  a voltage detecting unit coupled to the first end and the second end, respectively, and the voltage detecting unit configured to determine a voltage difference between the first end and the second end; and
  a signal amplifying unit, being coupled to the voltage detecting unit, operatively amplifying the determining result of the voltage detecting unit to correspondingly generate the detecting voltage.

13. The server as claimed in claim 12, wherein the voltage detecting unit comprises:
  a voltage substractor having a first input end, a second input end, and a first output end, the first input end being coupled to the first end, and the second input end being coupled to the second end and the first output end;
  a first resistor, being coupled between the first end and the first input end;
  a second resistor, being coupled between the second end and the second input end;
  a third resistor, being coupled between the first input end and a ground; and
  a fourth resistor, being coupled between the second input end and the first output end.

14. The server as claimed in claim 13, wherein the signal amplifying unit comprises:
  a voltage amplifier having a third input end, a fourth input end, and a second output end, the third input end being coupled to the first output end of the voltage subtractor, the fourth input end being coupled to the second output end, and the second output end being further coupled to the comparing unit;
  a fifth resistor, being coupled between the fourth input end and the ground; and
  a sixth resistor, being coupled between the fourth input end and the second output end.

15. The server as claimed in claim 14, wherein the comparing unit comprises a comparator having a fifth input end, a sixth input end, and a third output end, the fifth input end being coupled to the second output end, the sixth input end being coupled to the reference voltage, and the third output end being configured for outputting the control voltage to the power switch.

16. The server as claimed in claim 15, wherein the power switch is a PMOS transistor, a source of the PMOS transistor being coupled to the second end of the detecting component, a drain of the PMOS transistor being coupled to the load, and a gate of the PMOS transistor being coupled to the comparing unit to receive the control voltage.

17. The server as claimed in claim 15, wherein the detecting component is a resistor.

18. The server as claimed in claim 11, wherein the power switch is a PMOS transistor, a source of the PMOS transistor being coupled to the second end of the detecting component, a drain of the PMOS transistor being coupled to the load, and a gate of the PMOS transistor being coupled to the comparing unit to receive the control voltage.

19. The server as claimed in claim 11, wherein the detecting component is a resistor.

20. A mainboard coupled to a power supply module, the mainboard comprising:
  a load disposed on the mainboard; and
  an overcurrent protection circuit disposed on the mainboard and coupled between the power supply module and the load, the overcurrent protection circuit comprising:
    a detecting component having a first end and a second end, the first end being coupled to the power supply module to receive a supplying current outputted from the power supply module;
    a detection unit coupled to the first end and the second end, respectively, the detection unit operatively detecting a detecting voltage generated by the detecting component responsive to the supplying current outputted from the power supply module, wherein the detection voltage is the voltage difference between the first end and the second end;
    a comparing unit coupled to the detection unit, configured to compare the detecting voltage with a reference voltage to generate a control voltage;
    a power switch coupled between the second end and the load, the power switch also coupled to the comparing unit and being controlled by the control voltage; and
    a soft-start unit coupled between the comparing unit and the power switch and configured to turn on the power switch after a predetermined time;
    wherein when the comparing unit determines that the detecting voltage is greater than the reference voltage, the comparing unit cuts off the power switch and disconnects a power supply path between the power supply module and the load; and wherein the soft-start unit comprises:

a first NMOS transistor, a drain of the first NMOS transistor being coupled to the second end of the detecting component, a source of the first NMOS transistor being coupled to a ground, and a gate of the first NMOS transistor being coupled to the comparing unit to receive the control voltage;

a second NMOS transistor, a drain of the second NMOS transistor being coupled to the second end of the detecting component, a source of the second NMOS transistor being coupled to the ground, and a gate of the second NMOS transistor being coupled to the drain of the first NMOS transistor;

a first capacitor, being coupled between the gate of the second NMOS transistor and the ground; and a seventh resistor, being coupled to the first capacitor in parallel.

* * * * *